2,787,638
Patented Apr. 2, 1957

2,787,638

DETERGENT CYCLOHEXYL-CYCLOHEXYL BENZENE SULFONIC ACIDS AND THEIR ALKALI METAL SALTS

Allen H. Lewis, Berkeley, Calif., assignor to California Research Corporation, San Francisco, Calif., a corporation of Delaware No Drawing. Application December 7, 1953, Serial No. 396,725

7 Claims. (Cl. 260—505)

This invention relates to novel surface-active agents. More particularly, the invention concerns a novel class of sulfonic acids and salts thereof possessing superior detergent properties.

Many sulfonic acids and their salts are known to the chemical art. Some of them are presently of particular importance for their ability to function as surface-active agents. Because of the ever increasing demand for these agents, a great deal of effort is constantly expended to develop new types of surface-active sulfonic acids and salts thereof.

I have now discovered a novel class of surface-active agents, namely, 4'-cyclohexyl-cyclohexyl-benzene sulfonic acids and alkali metal salts thereof which are characterized by an unusual molecular structure and superior detergent properties.

The novel 4'-cyclohexyl-cyclohexyl-benzene sulfonic acids and their salts may be illustrated by the general formula

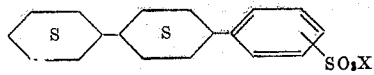

in which X is a member of the group consisting of hydrogen and the alkali metal and

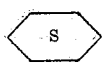

designates a cyclohexyl radical.

The 4'-cyclohexyl-cyclohexyl-benzene sulfonic acids and salts thereof according to my invention are unique in that the benzene ring is substituted by a dicycloalkyl group of 12 carbon atoms. This cycloalkyl group imparts structural rigidity to the molecule of the surface-active agents of this invention and distinguishes them from ordinary alkyl benzene sulfonic acids and their salts.

Although the above compounds are preferred since they contain an optimum of 12 carbon atoms in cyclic structure, other cycloalkyl groups on the benzene ring are also contemplated. Such compounds include, as their hydrocarbon portion, dicyclopentyl-benzene, pentyl-cyclopentyl-benzene, methyl-cyclopentyl-cyclopentyl-benzene, hexyl - cyclopentyl - benzene, cyclopentyl-cyclohexyl-benzene, ethyl-cyclopentyl-cyclopentyl-benzene, hexyl-cyclohexyl-benzene, heptyl-cyclopentyl-benzene, heptyl-cyclohexyl - benzene, propyl-cyclopentyl-cyclopentyl-benzene, butyl-cyclopentyl-cyclopentyl-benzene, and similar cycloalkyl groups of 10 to 14 carbon atoms.

Unlike the alkyl benzene groups of the alkyl benzene sulfonic acids and salts known heretofore, the 4'-cyclohexyl-cyclohexyl-benzene exists in the form of geometric isomers. The cis isomer is a colorless oil boiling at 150° C. at one mm. of mercury pressure while the trans isomer is a crystalline material having a melting point of 81.6–82.2° C. Although superior detergents may be prepared from either isomer, the cis isomer is preferred since the detergent prepared from it are more effective at low concentrations.

The 4'-cyclohexyl-cyclohexyl-benzene may be prepared by Grignard type of reaction. In this reaction, bromobenzene is reacted with magnesium to produce the Grignard reagent phenyl magnesium bromide. The Grignard reagent is then reacted with para-cyclohexyl-cyclohexanone to give 4'-cyclohexyl-cyclohexan-1'-ol-benzene. This may be dehydrated to 4'-cyclohexyl-cyclohexen-1'-yl-benzene and then hydrogenated to give 4'-cyclohexyl-cyclohexyl-benzene.

The 4'-cyclohexyl-cyclohexyl-benzene may also be prepared by alkylating benzene with 4'-cyclohexyl-cyclohexanol in the presence of an alkylation catalyst such as hydrofluoric acid.

The 4' - cyclohexyl-cyclohexyl-benzene may be converted to the sulfonic acid by a sulfonating agent such as chlorosulfonic acid.

Although the 4'-cyclohexyl-cyclohexyl-benzene sulfonic acid itself is surface-active, it may be neutralized with a base such as the alkali metal hydroxides, alkaline earth oxides and hydroxides, ammonium hydroxides, amines and the like to give the corresponding salts which are unusually effective as detergents.

The following examples are offered in further illustration of the invention:

Example 1

5.0 grams of magnesium turnings and 300 ml. of ethyl ether were placed in a glass reaction flask equipped with reflux condenser. 31.5 grams of bromobenzene were added slowly while cooling to maintain the mixture at reflux conditions. To the phenyl magnesium bromide thus formed, 36.0 grams of p-cyclohexyl-cyclohexanone were added with continued cooling to maintain reflux conditions. The reaction mixture was then poured over ice and hydrochloric acid. An ether layer and a water layer were thus formed. The ether layer was separated from the water layer and dried over sodium carbonate. The ether was then evaporated off to give 4'-cyclohexyl-cyclohexan-1'-ol-benzene.

The 4' - cyclohexyl-cyclohexan-1'-ol-benzene obtained above was mixed with approximately 0.5 gram of copper sulfate in a glass reaction flask equipped with a reflux condenser and a water trap. Approximately 100 ml. of n-decane were added and the mixture heated under reflux until water removal was complete. The dehydrated product was then charged to a still and the n-decane distilled off to give 4'-cyclohexyl-cyclohexen-1'-yl-benzene.

The 4'-cyclohexyl-cyclohexen-1'-yl-benzene was hydrogenated over a platinum catalyst at room temperature under a pressure of only slightly more than one atmosphere of hydrogen in order to avoid hydrogenating the benzene ring. The 4'-cyclohexyl-cyclohexyl-benzene thus obtained was a colorless oil boiling at 145–150° C. at one mm. of mercury pressure.

The 4'-cyclohexyl-cyclohexyl-benzene was purified by dissolving it in isopentane and passing the solution through a column of silica gel to remove any contaminating nonhydrocarbon materials. Upon standing, the purified product separated into two phases consisting of the trans-4'-cyclohexyl-cyclohexyl-benzene in the form of light colored crystals and the cis-4'-cyclohexyl-cyclohexyl-benzene in the form of a colorless oil.

Example 2

708 grams of anhydrous hydrofluoric acid and one liter of benzene were placed in a stainless steel vessel equipped with stirring and cooling means. 273.4 grams of 4-cyclohexyl-cyclohexanol were added to the stirred and cooled mixture of benzene and hydrofluoric acid over a period of two hours. The stirring was continued for one hour after the addition was complete. The reaction mixture was then poured onto ice and neutralized with potassium hydroxide. At this point, the reaction mixture separated into an aqueous layer and a hydrocarbon layer. The aqueous layer was discarded and the hydrocarbon layer was then washed with water and dried over anhydrous sodium carbonate. The hydrocarbon mixture was then decolorized by passing through a column of silica gel following which the benzene was evaporated off to give 374 grams of crude product. The crude product was then purified by distillation in a spinning band column to give approximately 200 ml. of 4'-cyclohexyl-cyclohexyl-benzene in the form of a colorless oil boiling at 150° C. at one mm. mercury pressure.

The 4'-cyclohexyl-cyclohexyl-benzene obtained above was mixed with isopentane and chilled in a Dry Ice and acetone bath. The solid trans-4'-cyclohexyl-cyclohexyl-benzene which crystallized out was separated by filtration. It had a melting point of 81.6–82.2° C. The carbon and hydrogen analysis of the material was as follows:

|  | C | H |
|---|---|---|
| Calculated | 89.18 | 10.82 |
| Observed | 89.07–89.04 | 10.38–10.44 |

The isopentane was then evaporated from the filtrate to give the cis-4'-cyclohexyl-cyclohexyl-benzene as a colorless oil boiling at 150° C. under one mm. mercury pressure. It possessed the following carbon and hydrogen analysis:

|  | C | H |
|---|---|---|
| Calculated | 89.18 | 10.82 |
| Observed | 89.36–89.34 | 10.72–10.83 |

Example 3

16.5 grams of the solid trans-4'-cyclohexyl-cyclohexyl-benzene prepared above were dissolved in 100 ml. of methylene chloride in a glass vessel. 8.75 grams of chlorosulfonic acid were then added slowly to the mixture while cooling and stirring. The stirring was continued for about 40 minutes following the addition. The 4'-cyclohexyl-cyclohexyl-benzene sulfonic acid thus obtained exhibited definite surface-active properties as evidenced by its foaming tendencies while in solution.

Approximately 300 ml. of ethyl alcohol were added to the 4'-cyclohexyl-cyclohexyl-benzene sulfonic acid reaction mixture and the resulting solution was then neutralized with 50 percent aqueous sodium hydroxide solution. The mixture was evaporated to dryness and purified by extraction by ethyl alcohol. The extract was then chilled to give the purified trans isomer of 4'-cyclohexyl-cyclohexyl-benzene sodium sulfonate in the form of white plate-like crystals which were removed by filtration and dried.

Example 4

85.0 grams of the liquid cis-4'-cyclohexyl-cyclohexyl-benzene from Example 2 were mixed with 100 ml. of methylene chloride in a glass vessel. 43.0 grams of chlorosulfonic acid were then added slowly to the mixture while cooling and stirring. Following the addition, the stirring was continued for about 40 minutes. The 4' - cyclohexyl - cyclohexyl - benzene sulfonic acid thus obtained exhibited definite surface-active properties as shown by its tendency to foam in solution.

Approximately 500 ml. of ethyl alcohol were added to the 4'-cyclohexyl-cyclohexyl-benzene sulfonic acid mixture prepared above. The solution was neutralized with strong aqueous sodium hydroxide and the resulting mixture filtered while hot to remove any sodium chloride and sodium sulfate contaminants formed. The filtrate was then chilled to give the cis isomer of 4'-cyclohexyl-cyclohexyl-benzene sodium sulfonate as a white plate-like crystalline precipitate.

Detergent compositions of the trans- and cis-4'-cyclohexyl-cyclohexyl-benzene sodium sulfonate were prepared according to the following formula:

20% by weight active
23% by weight sodium sulfate
2% by weight lauric isopropanol amide
55% by weight sodium tripolyphosphate The cotton laundering detergency of the formulations was determined in the Launder-O-Maer test described in the "Official Test Methods of American Association of Textile Chemists and Colorists," published in 1940. The trans- and cis-4'-cyclohexyl-cyclohexyl-benzene sodium sulfonate formulations were found to have detergent indexes of 84 and 90, respectively, at a concentration of only 0.2 percent, by weight, in water of 300 p. p. m. hardness. By comparison, a similar formulation containing conventional dodecyl benzene sodium sulfonate gave a detergency index of only 69 at the same concentration.

I claim:

1. Compounds of the formula

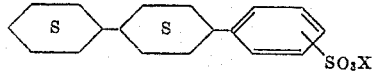

in which X is a member of the group consisting of hydrogen and the alkali metals and

designates a cyclohexyl radical, the sodium salts of which are characterized by a soil-removal effectiveness greater than that of sodium dodecyl benzene sulfonate in 300 p. p. m. hard water.

2. 4'-cyclohexyl-cyclohexyl-benzene sulfonic acid.
3. 4'-cyclohexyl-cyclohexyl-benzene sodium sulfonate.
4. Trans - 4' - cyclohexyl-cyclohexyl-benzene sulfonic acid.
5. Cis-4'-cyclohexyl-cyclohexyl-benzene sulfonic acid.
6. Trans-4'-cyclohexyl-cyclohexyl-benzene sodium sulfonate.
7. Cis - 4' - cyclohexyl-cyclohexyl-benzene sodium sulfonate.

References Cited in the file of this patent
UNITED STATES PATENTS

| 2,028,271 | Brodersen et al. | Jan. 21, 1936 |
| 2,463,497 | Smith et al. | Mar. 1, 1949 |

OTHER REFERENCES

Braun et al.: Ber. Deut. Chem., 66B, 1471 (1933).